US010061698B2

(12) United States Patent
Koob et al.

(10) Patent No.: US 10,061,698 B2
(45) Date of Patent: Aug. 28, 2018

(54) REDUCING OR AVOIDING BUFFERING OF EVICTED CACHE DATA FROM AN UNCOMPRESSED CACHE MEMORY IN A COMPRESSION MEMORY SYSTEM WHEN STALLED WRITE OPERATIONS OCCUR

(71) Applicant: QUALCOMM Incorporated, San Diego, CA (US)

(72) Inventors: Christopher Edward Koob, Round Rock, TX (US); Richard Senior, San Diego, CA (US); Gurvinder Singh Chhabra, San Diego, CA (US); Andres Alejandro Oportus Valenzuela, San Diego, CA (US); Nieyan Geng, San Diego, CA (US); Raghuveer Raghavendra, San Diego, CA (US); Christopher Porter, Athens, GA (US); Anand Janakiraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/420,667

(22) Filed: Jan. 31, 2017

(65) Prior Publication Data
US 2018/0217930 A1 Aug. 2, 2018

(51) Int. Cl.
*G06F 12/08* (2016.01)
*G06F 12/0808* (2016.01)
*G06F 12/128* (2016.01)

(52) U.S. Cl.
CPC ........ *G06F 12/0808* (2013.01); *G06F 12/128* (2013.01); *G06F 2212/621* (2013.01); *G06F 2212/69* (2013.01)

(58) Field of Classification Search
CPC .............. G06F 3/0661; G06F 12/0804; G06F 12/0808; G06F 12/0891; G06F 12/128; G06F 2212/621; G06F 2212/69
(Continued)

(56) References Cited

U.S. PATENT DOCUMENTS 7,702,875 B1 * 4/2010 Ekman ................ G06F 12/08
710/68
8,806,101 B2 8/2014 Sheaffer et al.
(Continued)

FOREIGN PATENT DOCUMENTS

WO 2015142341 A1 9/2015
WO 2015179591 A1 11/2015
WO 2015199578 A1 12/2015

OTHER PUBLICATIONS

International Search Report and Written Opinion for PCT/US2018/012760, dated Apr. 16, 2018, 19 pages.

*Primary Examiner* — Gary J Portka
(74) *Attorney, Agent, or Firm* — W&T/Qualcomm

(57) ABSTRACT

Aspects disclosed involve reducing or avoiding buffering of evicted cache data from an uncompressed cache memory in a compression memory system when stalled write operations occur. A processor-based system is provided that includes a cache memory and a compression memory system. When a cache entry is evicted from the cache memory, cache data and a virtual address associated with the evicted cache entry are provided to the compression memory system. The compression memory system reads metadata associated with the virtual address of the evicted cache entry to determine the physical address in the compression memory system mapped to the evicted cache entry. If the metadata is not available, the compression memory system stores the evicted cache data at a new, available physical address in the compression memory system without waiting for the meta-
(Continued)

data. Thus, buffering of the evicted cache data to avoid or reduce stalling write operations is not necessary.

22 Claims, 7 Drawing Sheets

(58) Field of Classification Search
USPC .......................... 710/68; 711/133, 135, 143
See application file for complete search history.

(56) References Cited

U.S. PATENT DOCUMENTS

| | | |
|---|---|---|
| 8,813,052 B2 | 8/2014 | Gray et al. |
| 9,141,486 B2 | 9/2015 | Venkatachalam et al. |
| 2003/0217237 A1 | 11/2003 | Benveniste et al. |
| 2005/0114601 A1 | 5/2005 | Ramakrishnan |
| 2014/0006745 A1 | 1/2014 | Fontenot et al. |
| 2014/0237189 A1 | 8/2014 | Glasco et al. |
| 2015/0193353 A1 | 7/2015 | Habermann |
| 2015/0242309 A1 | 8/2015 | Talagala et al. |
| 2015/0278097 A1 | 10/2015 | Kelm et al. |
| 2015/0379684 A1 | 12/2015 | Ramani et al. |
| 2016/0098356 A1 | 4/2016 | Shiu |
| 2016/0342530 A1* | 11/2016 | Pellerin, III ........ G06F 12/0895 |
| 2017/0004069 A1 | 1/2017 | Li et al. |
| 2017/0206172 A1 | 7/2017 | Ma et al. |
| 2017/0278215 A1* | 9/2017 | Appu ........................ G06T 1/20 |
| 2017/0364446 A1* | 12/2017 | Pham .................. G06F 12/1027 |
| 2018/0138921 A1 | 5/2018 | Arelakis et al. |
| 2018/0173623 A1 | 6/2018 | Koob et al. |

* cited by examiner

REDUCING OR AVOIDING BUFFERING OF EVICTED CACHE DATA FROM AN UNCOMPRESSED CACHE MEMORY IN A COMPRESSION MEMORY SYSTEM WHEN STALLED WRITE OPERATIONS OCCUR

BACKGROUND

I. Field of the Disclosure

The technology of the disclosure relates generally to computer memory systems, and more particularly to compression memory systems configured to compress and decompress data stored in and read from compressed system memory.

II. Background

As applications executed by conventional processor-based systems increase in size and complexity, memory capacity requirements may increase. Memory size can be increased in a processor-based system to increase memory capacity. However, increasing the memory size may require increasing the area for providing additional memory. For example, providing additional memory and/or wider memory addressing paths to increase memory size may incur a penalty in terms of increased cost and/or additional area for memory on an integrated circuit (IC). Further, increasing memory capacity can increase power consumption and/or impact overall system performance of a processor-based system. Thus, one approach to increase memory capacity of a processor-based system without having to increase memory size is through the use of data compression. A data compression system can be employed in a processor-based system to store data in a compressed format, thus increasing effective memory capacity without increasing physical memory capacity.

In some conventional data compression systems, a compression engine is provided to compress data to be written to a main system memory. After performing data compression, the compression engine writes the compressed data to the system memory. Because the effective memory capacity is larger than the actual memory size, a virtual-to-physical address translation is performed to write compressed data to system memory. In this regard, some conventional data compression systems additionally write compressed data along with "metadata" to system memory. The metadata is data that contains a mapping of the virtual address of the compressed data to the physical address in the system memory where the compressed data is actually stored. However, the use of metadata may result in an increased risk of stalling the processor when cache data is evicted from a cache memory to be stored in system memory. For example, in data compression schemes in which different sized blocks are tracked for use in storing compressed data, a write operation to the system memory (e.g., resulting from an eviction from a cache memory) may require a lookup to the system memory to determine whether a previously used block for storing compressed data can be reused. Due to inherent memory latency, accessing metadata in this manner may result in a processor stall while the metadata is retrieved.

One alternative for averting processor stalls is to provide an evict buffer to store the evicted cache data from the cache memory. This approach, though, may consume additional area on the physical processor chip. Thus, it is desirable to provide a more efficient mechanism for avoiding stalls while minimizing buffer size.

SUMMARY OF THE DISCLOSURE

Aspects of the present disclosure involve reducing or avoiding buffering of evicted cache data from an uncompressed cache memory in a compression memory system when stalled write operations occur. In exemplary aspects disclosed herein, a processor-based system is provided that includes a cache memory and a compression memory system. When a cache entry is evicted from the cache memory, the cache data and the virtual address associated with the evicted cache entry are provided to the compression memory system. The compression memory system reads metadata associated with the virtual address of the evicted cache entry from a metadata cache. The metadata cache contains a cached subset of the metadata entries in a metadata circuit in the compressed system memory. The metadata is used to access a physical address in a compressed system memory in the compression memory system, so that the evicted cache data is stored in a physical address corresponding to the virtual address of the evicted cache data for future access. If the metadata is available from the metadata cache, the compression memory system stores the evicted cache data at the physical address in the compressed system memory based on the read metadata. However, if the metadata is not available from the metadata cache, the compression memory system stores the evicted cache data at a new, available physical address in the compressed system memory without waiting for the metadata from the metadata circuit in the compressed system memory. Thus, buffering of the evicted cache data to avoid or reduce stalling write operations by the processor is not necessary. However, metadata associated with the new physical address is buffered so that when the metadata becomes available from the metadata circuit, the old physical address associated with the old metadata can be freed for future use to store new compressed data. The metadata circuit is updated with the new metadata associated with the new physical address so that future accesses to that virtual address will obtain compressed data at the correct, new physical address in the compressed system memory. In this manner, buffering requirements are reduced, because the storage size of the metadata is less than the size of an evicted cache entry, thereby reducing area and power consumption over buffering the evicted cache data.

In this regard, in one exemplary aspect, a compression circuit in a processor-based system is provided. In response to eviction of a cache entry in a cache memory, the compression circuit is configured to receive uncompressed cache data and a virtual address associated with the evicted cache entry in the cache memory. The compression circuit is also configured to compress the uncompressed cache data into compressed data of a compression size. The compression circuit is also configured to read first metadata from a metadata cache associated with the virtual address associated with the evicted cache entry. The metadata cache comprises a plurality of metadata cache entries each indexed by a virtual address. Each metadata cache entry among the plurality of metadata cache entries comprises metadata associated with a physical address in a compressed system memory. The compression circuit is also configured to read second metadata from a metadata circuit in the compressed system memory associated with the virtual address associated with the evicted cache entry into the metadata cache. The metadata circuit comprises a plurality of metadata entries each indexed by a virtual address, each metadata entry among the plurality of metadata entries comprising metadata associated with a physical address in the compressed system memory. In response to the first metadata associated with the virtual address associated with the evicted cache entry not being available from the metadata cache after compressing the uncompressed cache data into the compressed data of the compression size, the compression circuit is also configured to obtain an index to a new memory block in a memory entry associated with a new physical address from a free list, store the compressed data in the new memory block at the memory entry at the new physical address in the compressed system memory based on the obtained index, store new metadata associated with the new physical address of the new memory block in a metadata buffer, and store the new metadata from the metadata buffer in the metadata entry associated with the virtual address associated with the evicted cache entry in the metadata circuit in the compressed system memory.

In another exemplary aspect, a method of evicting cache data from an evicted cache entry to a compressed system memory is provided. The method comprises receiving uncompressed cache data and a virtual address associated with the evicted cache entry from a cache memory. The method also comprises compressing the uncompressed cache data into compressed data of a compression size. The method also comprises reading first metadata from a metadata cache associated with the virtual address associated with the evicted cache entry. The method also comprises reading second metadata from a metadata circuit in the compressed system memory associated with the virtual address associated with the evicted cache entry into the metadata cache. In response to the first metadata associated with the virtual address associated with the evicted cache entry not being available from the metadata cache after compressing the uncompressed cache data into the compressed data of the compression size, the method also comprises obtaining an index to a new memory block in a memory entry associated with a new physical address from a free list, storing the compressed data in the new memory block at the memory entry at the new physical address in the compressed system memory based on the obtained index, storing new metadata associated with the new physical address of the new memory block in a metadata buffer, and storing the new metadata from the metadata buffer in a metadata entry associated with the virtual address associated with the evicted cache entry in the metadata circuit in the compressed system memory.

In another exemplary aspect, a processor-based system is provided. The processor-based system comprises a processor core configured to issue memory read operations and memory write operations. The processor-based system also comprises a metadata cache comprising a plurality of metadata cache entries each indexed by a virtual address, each metadata cache entry among the plurality of metadata cache entries comprising first metadata associated with a physical address in a compressed system memory. The compressed system memory comprises a plurality of memory entries each addressable by a physical address and each configured to store compressed data. The compressed system memory also comprises a metadata circuit comprising a plurality of metadata entries each indexed by a virtual address. Each metadata entry among the plurality of metadata entries comprises second metadata associated with a physical address in the compressed system memory. The processor-based system also comprises a compression circuit. The compression circuit is configured to, in response to eviction of a cache entry in a cache memory, receive uncompressed cache data and the virtual address associated with the evicted cache entry from the cache memory, compress the uncompressed cache data into compressed data of a compression size, read the first metadata from the metadata cache associated with the virtual address associated with the evicted cache entry, and read the second metadata from the metadata circuit in the compressed system memory based on the virtual address associated with the evicted cache entry into the metadata cache. In response to the first metadata associated with the virtual address associated with the evicted cache entry not being available from the metadata cache after compressing the uncompressed cache data into the compressed data of the compression size, the compression circuit is further configured to obtain an index to a new memory block in a memory entry associated with a new physical address from a free memory block list, store the compressed data in the new memory block at the memory entry at the new physical address in the compressed system memory based on the obtained index, store new metadata associated with the new physical address of the new memory block in a metadata buffer, and store the new metadata from the metadata buffer in the metadata entry associated with the virtual address associated with the evicted cache entry in the metadata circuit in the compressed system memory.

In another exemplary aspect, a compression circuit in a processor-based system is provided. The compression circuit comprises a means for receiving uncompressed cache data and a virtual address associated with an evicted cache entry from a cache memory. The compression circuit also comprises a means for compressing the uncompressed cache data into compressed data of a compression size. The compression circuit also comprises a means for reading first metadata from a metadata cache associated with the virtual address associated with the evicted cache entry. The compression circuit also comprises a means for reading second metadata from a metadata circuit in a compressed system memory associated with the virtual address associated with the evicted cache entry into the metadata cache. In response to the first metadata associated with the virtual address associated with the evicted cache entry not being available from the metadata cache after compressing the uncompressed cache data into the compressed data of the compression size, the compression circuit also comprises a means for obtaining an index to a new memory block in a memory entry associated with a new physical address from a free list, a means for storing the compressed data in the new memory block at the memory entry at the new physical address in the compressed system memory based on the obtained index, a means for storing new metadata associated with the new physical address of the new memory block in a metadata buffer, and a means for storing the new metadata from the metadata buffer in a metadata entry associated with the virtual address associated with the evicted cache entry in the metadata circuit in the compressed system memory.

In another exemplary aspect, a non-transitory computer-readable medium is provided having stored thereon computer executable instructions which, when executed, cause a processor to receive uncompressed cache data and a virtual address associated with an evicted cache entry from a cache memory. The computer executable instructions, when executed, also cause the processor to compress the uncompressed cache data into compressed data of a compression size. The computer executable instructions, when executed, also cause the processor to read first metadata from a metadata cache associated with the virtual address associated with the evicted cache entry. The computer executable instructions, when executed, also cause the processor to read second metadata from a metadata circuit in a compressed system memory associated with the virtual address associated with the evicted cache entry into the metadata cache. In response to the first metadata associated with the virtual address associated with the evicted cache entry not being available from the metadata cache after compressing the uncompressed cache data into the compressed data of the compression size, the computer executable instructions, when executed, also cause the processor to obtain an index to a new memory block in a memory entry associated with a new physical address from a free list, store the compressed data in the new memory block at the memory entry at the new physical address in the compressed system memory based on the obtained index, store new metadata associated with the new physical address of the new memory block in a metadata buffer, and store the new metadata from the metadata buffer in a metadata entry associated with the virtual address associated with the evicted cache entry in the metadata circuit in the compressed system memory.

DETAILED DESCRIPTION

Figure 1:
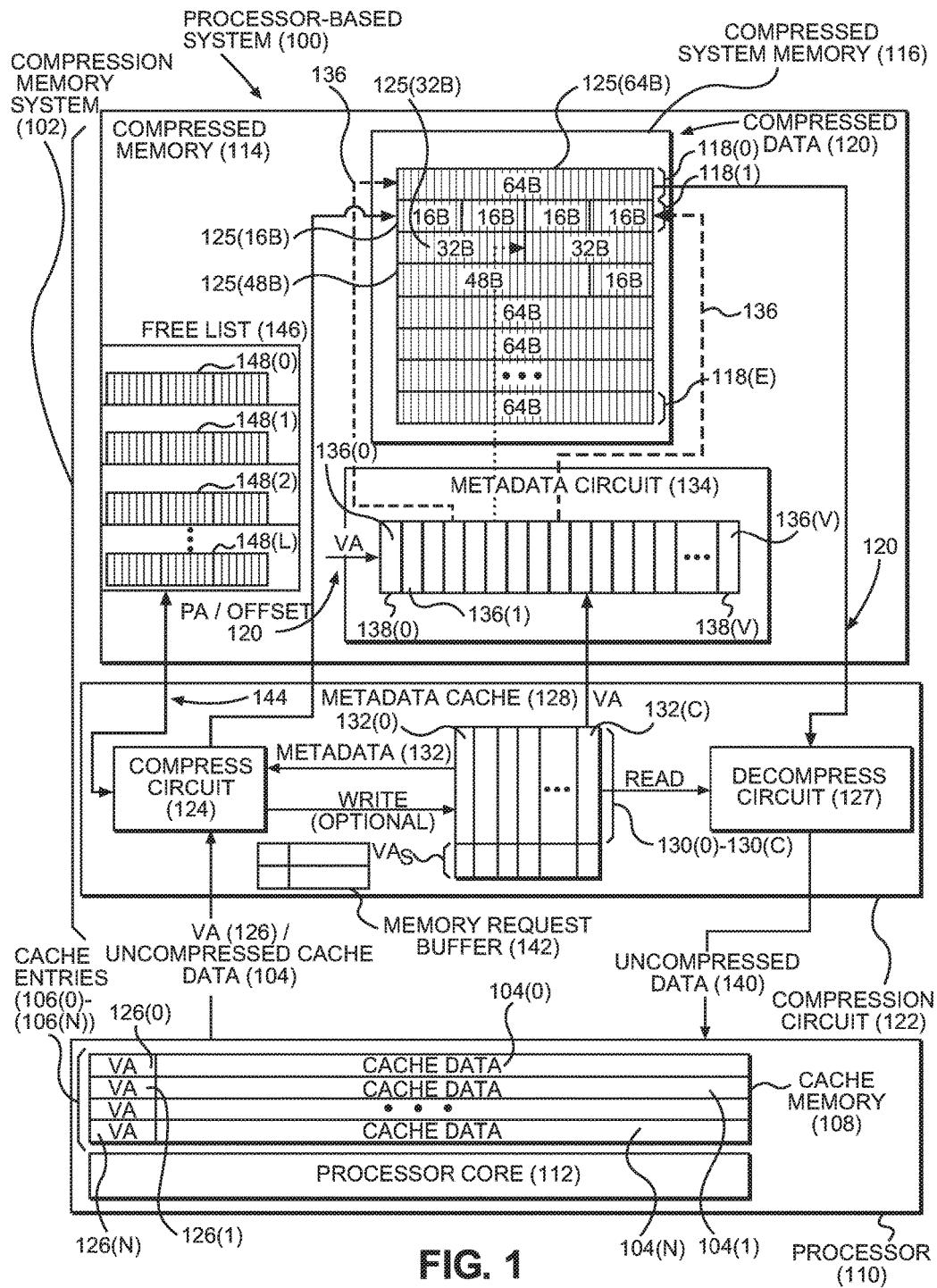
FIG. 1 is a schematic diagram of an exemplary processor-based system that includes a compression memory system configured to compress cache data from an evicted cache entry in a cache memory, and read metadata used to access the physical address in a compressed system memory to write the compressed evicted cache data.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects of the present disclosure involve reducing or avoiding buffering evicted cache data from an uncompressed cache memory in a compressed memory when stalled write operations occur. In exemplary aspects disclosed herein, a processor-based system is provided that includes a cache memory and a compression memory system. When a cache entry is evicted from the cache memory, the cache data and the virtual address associated with the evicted cache entry are provided to the compression memory system. The compression memory system reads metadata associated with the virtual address of the evicted cache entry from a metadata cache. The metadata cache contains a cached subset of the metadata entries in a metadata circuit in the compressed system memory. The metadata is used to access a physical address in a compressed system memory in the compression memory system, so that the evicted cache data is stored in a physical address corresponding to the virtual address of the evicted cache data for future access. If the metadata is available from the metadata cache, the compression memory system stores the evicted cache data at the physical address in the compressed system memory based on the read metadata. However, if the metadata is not available from the metadata cache, the compression memory system stores the evicted cache data at a new, available physical address in the compressed system memory without waiting for the metadata from the metadata circuit in the compressed system memory. Thus, buffering of the evicted cache data to avoid or reduce stalling write operations by the processor is not necessary. However, metadata associated with the new physical address is buffered so that when the metadata becomes available from the metadata circuit, the old physical address associated with the old metadata can be freed for future use to store new compressed data. The metadata circuit is updated with the new metadata associated with the new physical address so that future accesses to that virtual address will obtain compressed data at the correct, new physical address in the compressed system memory. In this manner, buffering requirements are reduced, because the storage size of the metadata is less than the size of an evicted cache entry, thereby reducing area and power consumption over buffering the evicted cache data.

Figure 2:
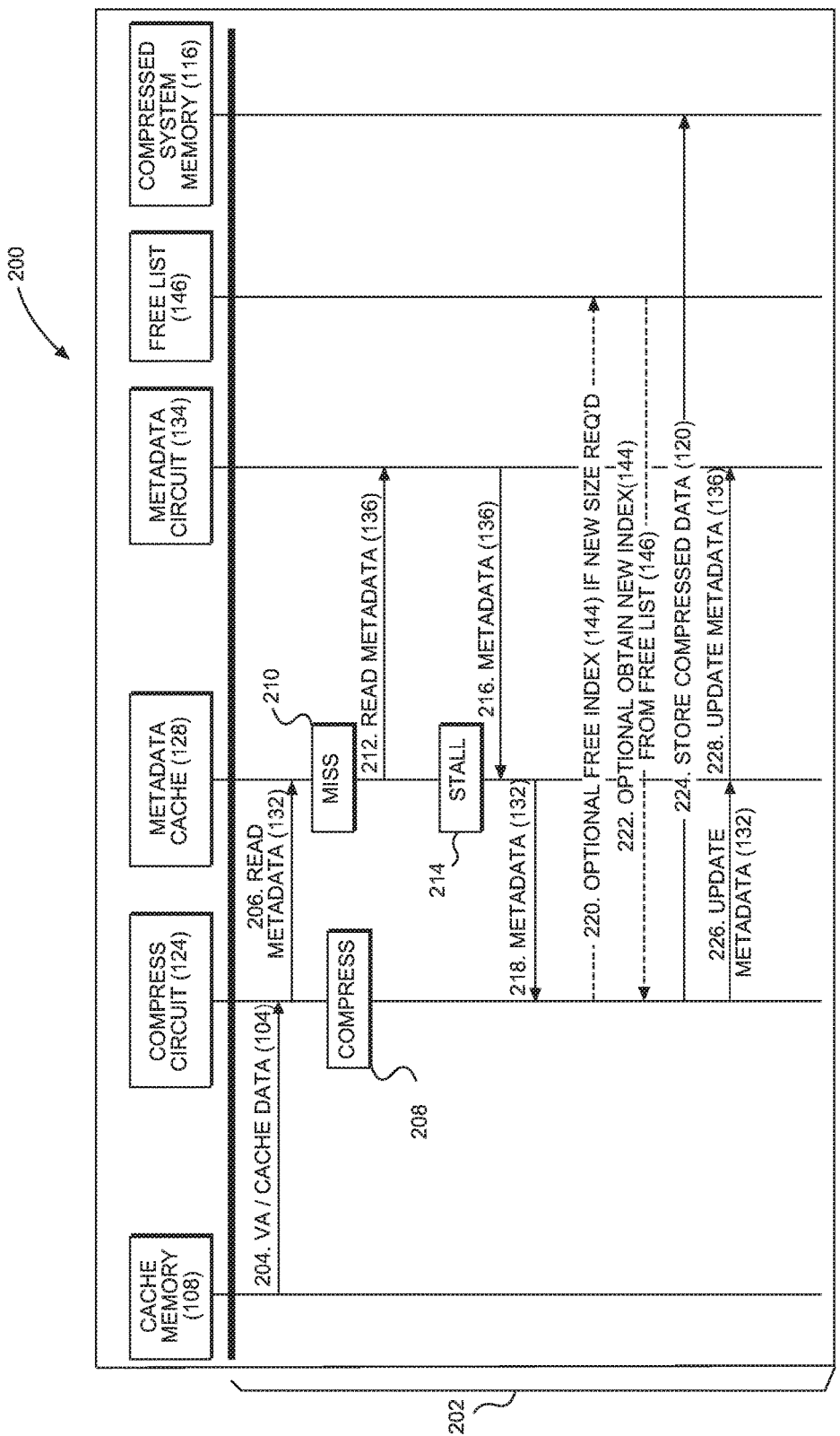
FIG. 2 is a flow diagram illustrating an exemplary process of the processor-based system in FIG. 1 evicting a cache entry from a cache memory, compressing the cache data from the evicted cache entry, and writing the compressed cache data at a physical address in the compressed system memory determined from read metadata mapping to the virtual address of the evicted cache entry to its physical address in the compressed system memory.
Figure 3:
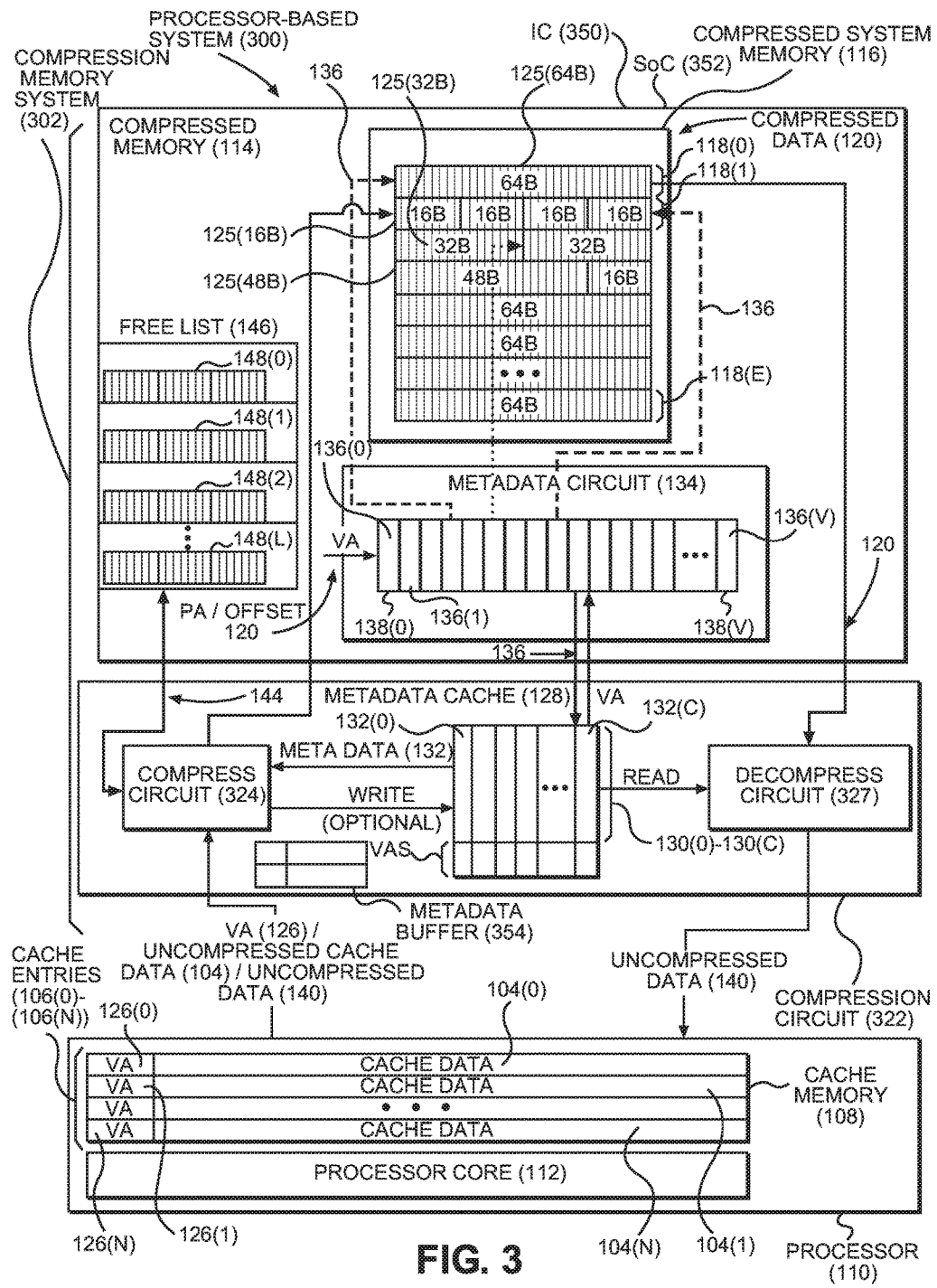
FIG. 3 is schematic diagram of an exemplary processor-based system that includes a memory system comprising a compression circuit configured to compress evicted cache data from an evicted cache entry in cache memory, and store the compressed evicted cache data at a new physical address in a compressed system memory if metadata used to map the virtual address for the evicted cache entry to a physical address in compressed system memory is not available, to avoid having to buffer the evicted cache data until the metadata becomes available.

Before discussing examples of processor-based systems that include compression memory systems that can avoid buffering of evicted cache data from an evicted cache entry when stalls occur reading metadata used for determining a physical address in a compressed system memory to write the evicted cache data starting at FIG. 3, FIGS. 1 and 2 are first described. FIG. 1 illustrates a processor-based system 100 that is configured to buffer evicted cache data from an evicted cache entry when stalls occur reading metadata used for determining a physical address in a compressed system memory to write the evicted cache data. FIG. 2 describes a cache eviction process performed by the processor-based system 100 in FIG. 1.

In this regard, FIG. 1 is a schematic diagram of an exemplary processor-based system 100 that includes a compression memory system 102. The processor-based system 100 is configured to store cache data 104(0)-104(N) in uncompressed form in cache entries 106(0)-106(N) in a cache memory 108. The cache entries 106(0)-106(N) may be cache lines. For example, as shown in FIG. 1, the cache memory 108 may be a level 2 (L2) cache memory included in a processor 110. The cache memory 108 may be private cache memory that is private to a processor core 112 in the processor 110 or shared cache memory shared between multiple processor cores, including the processor core 112 in the processor 110. The compression memory system 102 includes a compressed memory 114 that includes compressed system memory 116 configured to store data in a memory entry 118(0)-118(E) (which may be memory lines) in compressed form, which is shown in FIG. 1 and referred to herein as compressed data 120. For example, the compressed system memory 116 may be a double data rate (DDR) static random access memory (SRAM). The processor 110 is configured to access the compressed system memory 116 in read and write operations to execute software instructions and perform other processor operations.

Providing the ability to store the compressed data 120 in the compressed system memory 116 increases the memory capacity of the processor-based system 100 over the physical memory size of the compressed system memory 116. The processor 110 can use virtual addressing wherein a virtual-to-physical address translation is performed to effectively address the compressed data 120 in the compressed system memory 116 without being aware of the compression scheme and compression size of the compressed data 120. In this regard, a compression circuit 122 is provided in the compression memory system 102 to compress uncompressed data from the processor 110 to be written into the compressed system memory 116, and to decompress the compressed data 120 received from the compressed system memory 116 to provide such data in uncompressed form to the processor 110. The compression circuit 122 includes a compress circuit 124 configured to compress data from the processor 110 to be written into the compressed system memory 116. For example, as shown in FIG. 1, the compress circuit 124 may be configured to compress sixty-four (64) byte (64B) data words down to forty-eight (48) byte (48B), thirty-two (32) byte (32B), or sixteen (16) byte (16B) compressed data words which can be stored in respective memory blocks 125 (48B), 125 (32B), 125 (16B) of less width than the entire width of a memory entry 118(0)-118(E). If uncompressed data from the processor 110 cannot be compressed down to the next lower sized memory block 125 configured for the compression memory system 102, such uncompressed data is stored uncompressed over the entire width of a memory entry 118(0)-118(E). For example, the width of the memory entry 118(0)-118(E) may be 64B in this example that can store 64B memory blocks 125 (64B). The compression circuit 122 also includes a decompress circuit 127 configured to decompress the compressed data 120 from the compressed system memory 116 to be provided to the processor 110.

However, to provide for faster memory access without the need to compress and decompress, the cache memory 108 is provided. The cache entries 106(0)-106(N) in the cache memory 108 are configured to store the cache data 104(0)-104(N) in uncompressed form. Each of the cache entries 106(0)-106(N) may be the same width as each of the memory entries 118(0)-118(E) for performing efficient memory read and write operations. The cache entries 106(0)-106(N) are accessed by a respective virtual address (VA) 126(0)-126(N), because as discussed above, the compression memory system 102 provides more addressable memory space to the processor 110 than the physical address space provided in the compressed system memory 116. When the processor 110 issues a memory read request for a memory read operation, the virtual address of the memory read request is used to search the cache memory 108 to determine if the VA 126(0)-126(N), used as a tag, matches a cache entry 106(0)-106(N). If so, a cache hit occurs and the cache data 104(0)-104(N) in the hit cache entry 106(0)-106(N) is returned to the processor 110 without the need to decompress the cache data 104(0)-104(N). However, because the number of cache entries 106(0)-106(N) is 'N+1' which is less than the number of memory entries 118(0)-118(E) as 'E+1', a cache miss can occur where the cache data 104(0)-104(N) for the memory read request is not contained in the cache memory 108.

Thus, with continuing reference to FIG. 1, in response to a cache miss, the cache memory 108 is configured to provide the virtual address of the memory read request to the compression circuit 122 to retrieve the data from the compressed system memory 116. In this regard, the compress circuit 124 may first consult a metadata cache 128 that contains metadata cache entries 130(0)-130(C) each containing metadata 132(0)-132(C) indexed by a virtual address (VA). The metadata cache 128 is faster to access than the compressed system memory 116. The metadata 132(0)-132(C) is data, such as a pointer or index, used to access a physical address (PA) in the compressed system memory 116 to address to gain access to the memory entry 118(0)-118(E) containing the compressed data for the virtual address. If the metadata cache 128 contains metadata 132(0)-132(C) for the memory read operation, the compress circuit 124 uses the metadata 132(0)-132(C) to access the correct memory entry 118(0)-118(E) in the compressed system memory 116 to provide the corresponding compressed data 120 to the decompress circuit 127. If the metadata cache 128 does not contain metadata 132(0)-132(C) for the memory read request, the compress circuit 124 provides the virtual address (VA) for the memory read request to a metadata circuit 134 that contains metadata 136(0)-136(V) in corresponding metadata entries 138(0)-138(V) for all of the virtual address space in the processor-based system 100. Thus, the metadata circuit 134 can be linearly addressed by the virtual address of the memory read request. The metadata 136(0)-136(V) is used to access the correct memory entry 118(0)-118(E) in the compressed system memory 116 for the memory read request to provide the corresponding compressed data 120 to the decompress circuit 127.

With continuing reference to FIG. 1, the decompress circuit 127 receives the compressed data 120 in response to the memory read request. The decompress circuit 127 decompresses the compressed data 120 into uncompressed data 140, which can then be provided to the processor 110. The uncompressed data 140 is also stored in the cache memory 108. However, if the cache memory 108 did not have an available cache entry 106(0)-106(N), the cache memory 108 must evict an existing cache entry 106(0)-106(N) to the compressed system memory 116 to make room for storing the uncompressed data 140. In this regard, FIG. 2 is a flow diagram 200 illustrating an exemplary cache eviction process 202 performed in the processor-based system 100 in FIG. 1 when evicting a cache entry 106(0)-106(N) from the cache memory 108.

With reference to FIG. 2, the cache memory 108 first sends the VA and the uncompressed cache data 104 of the evicted cache entry 106(0)-106(N) to the compress circuit 124 as part of the cache eviction process 202 (task 204). The compress circuit 124 receives the VA and the uncompressed cache data 104 for the evicted cache entry 106(0)-106(N). The compress circuit 124 initiates a metadata read operation to the metadata cache 128 to obtain metadata 132 associated with the VA (task 206). During, before, or after the metadata read operation in task 206, the compress circuit 124 compresses the uncompressed cache data 104 into compressed data 120 to be stored in the compressed system memory 116 (task 208). If the metadata read operation to the metadata cache 128 results in a miss (task 210), the metadata cache 128 issues a metadata read operation to the metadata circuit 134 in the compressed system memory 116 to obtain the metadata 136 associated with the VA (task 212). The metadata cache 128 is stalled (task 214). Because accessing the compressed system memory 116 can take much longer than the processor 110 can issue memory access operations, uncompressed data received from the processor 110 for subsequent memory write requests will have to be buffered in a memory request buffer 142 (shown in FIG. 1), thus consuming additional area in the compression circuit 122 and power for operation. Otherwise, the processor 110 may have to be stalled in an undesired manner until the metadata 136 is obtained to be able to determine the correct physical address (PA) of the memory entry 118(0)-118(E) in the compressed system memory 116 corresponding to the VA to store the compressed data 120. Further, the memory request buffer 142 may have to be sized to potentially buffer a large number of subsequent memory write requests to avoid the processor 110 stalling.

With continuing reference to FIG. 2, after the metadata 136 comes back from the metadata circuit 134 to update the metadata cache 128 (task 216), the metadata cache 128 provides the metadata 136 as metadata 132 to the compress circuit 124 (task 218). The compress circuit 124 determines if the new compression size of the compressed data 120 fits into the same memory block size in the compressed system memory 116 as used to previously store data for the VA of the evicted cache entry 106(0)-106(N). For example, the processor 110 may have updated the cache data 104(0)-104(N) in the evicted cache entry 106(0)-106(N) since being last stored in the compressed system memory 116. If a new memory block 125 is needed to store the compressed data 120 for the evicted cache entry 106(0)-106(N), the compress circuit 124 recycles an index 144 (shown in FIG. 1) to the current memory block 125 in the compression memory system 102 associated with the VA of the evicted cache entry 106(0)-106(N) to a free list 146 for reuse (task 220). The free list 146 contains lists 148(0)-148(L) of indexes 144 to available memory blocks 125 in the compressed system memory 116. The compress circuit 124 then obtains an index 144 from the free list 146 to a new, available memory block 125 of the desired memory block size in the compressed system memory 116 to store the compressed data 120 for the evicted cache entry 106(0)-106(N) (task 222). The compress circuit 124 then stores the compressed data 120 for the evicted cache entry 106(0)-106(N) in the memory block 125 in the compressed system memory 116 associated with the VA for the evicted cache entry 106(0)-106(N) determined from the metadata 132. For example, the metadata 132 may be used to determine a physical address (PA) and offset to address a memory entry 118(0)-118(E) and memory block 125 therein in the compressed system memory 116. Alternatively, the metadata 132 may be a PA and offset itself. The compress circuit 124 stores the compressed data 120 for the evicted cache entry 106(0)-106(N) in the memory block 125 in the compressed system memory 116 associated with the VA for the evicted cache entry 106(0)-106(N), whether the memory block 125 is the previously assigned memory block 125 or a newly assigned memory block 125 (task 224).

With continuing reference to FIG. 2, if a new memory block 125 was assigned to the VA for the evicted cache entry 106(0)-106(N), the metadata 132(0)-132(C) in the metadata cache entry 130(0)-130(C) corresponding to the VA 126(0)-126(N) of the evicted cache entry 106(0)-106(N) is updated based on the index 144 to the new memory block 125 (task 226). The metadata cache 128 then updates the metadata 136(0)-136(V) in the metadata entry 138(0)-138(V) corresponding to the VA in the metadata cache 128 is based on the index 144 to the new memory block 125 (task 228).

It may be desired to avoid the need to provide the memory request buffer 142 to store memory write requests, including cache data 104(0)-104(N) evictions in the compression circuit 122. In this regard, FIG. 3 illustrates an exemplary processor-based system 300 that is configured to avoid the need to buffer subsequent write operations from a processor during a cache eviction process. The processor-based system 300 may be provided in a single integrated circuit (IC) 350 as a system-on-a-chip (SoC) 352 as examples. In this example, the processor-based system 300 includes a compression memory system 302 that includes the compressed system memory 116 in the processor-based system 100 in FIG. 1. The processor 110 provided in the processor-based system 300 in FIG. 3 is the processor 110 included in the processor-based system 100 in FIG. 1 in this example. The processor 110 includes the cache memory 108 previously discussed in regard to FIG. 1. The processor-based system 300 also includes other common components with the processor-based system 100 in FIG. 1, which are shown with common element numbers between FIG. 1 and FIG. 3.

As will be discussed in more detail below, the compression memory system 302 in the processor-based system 300 in FIG. 3 includes a compression circuit 322. The compression circuit 322 includes a compress circuit 324, a decompress circuit 327, and the metadata cache 128 previously described with regard to FIG. 1. The compress circuit 324 is configured to compresses the uncompressed cache data 104 from an evicted cache entry 106(0)-106(N) to be stored in the compressed system memory 116 as part of a cache eviction process. If metadata 132 associated with the evicted cache entry 106(0)-106(N) is not available from the metadata cache 128 (i.e., a cache miss to the metadata cache 128) for the compress circuit 324 to determine the physical address (PA) of the memory entry 118(0)-118(E) to write evicted cache entry 106(0)-106(N), the compress circuit 324 is configured to obtain a new index 144 from the free list 146 used to determine a PA in the compressed system memory 116 according to the compression size of the compressed data 120. The new index 144 is used to store the compressed data 120 in a new, available memory block 125 in a memory entry 118(0)-118(E) in the compressed system memory 116. Thus, the compress circuit 324 does not have to stall waiting for metadata 136 associated with the evicted cache entry 106(0)-106(N) to be returned from the metadata circuit 134 to the metadata cache 128 and then from the metadata cache 128 to the compress circuit 324, that would otherwise require the compressed data 120 to be buffered as discussed above in processor-based system 100 in FIG. 1. However, metadata associated with the new index 144 is buffered so that when the metadata 136 becomes available from the metadata circuit 134, the old index 144 associated with the old metadata 136 can be freed for future use to store new compressed data 120 in an available memory block 125 in the compressed system memory 116. The metadata cache 128 and the metadata circuit 134 are updated with the new metadata 132, 136 associated with the new index 144 so that future accesses to the VA associated with the new metadata 132, 136 will obtain compressed data from the correct location in the compressed system memory 116. In this manner, buffering requirements are reduced, because the storage size of the metadata 136 is less than the size of an evicted cache entry 106(0)-106(N), thereby reducing area and power consumption over buffering the evicted cache data.

Figure 4:
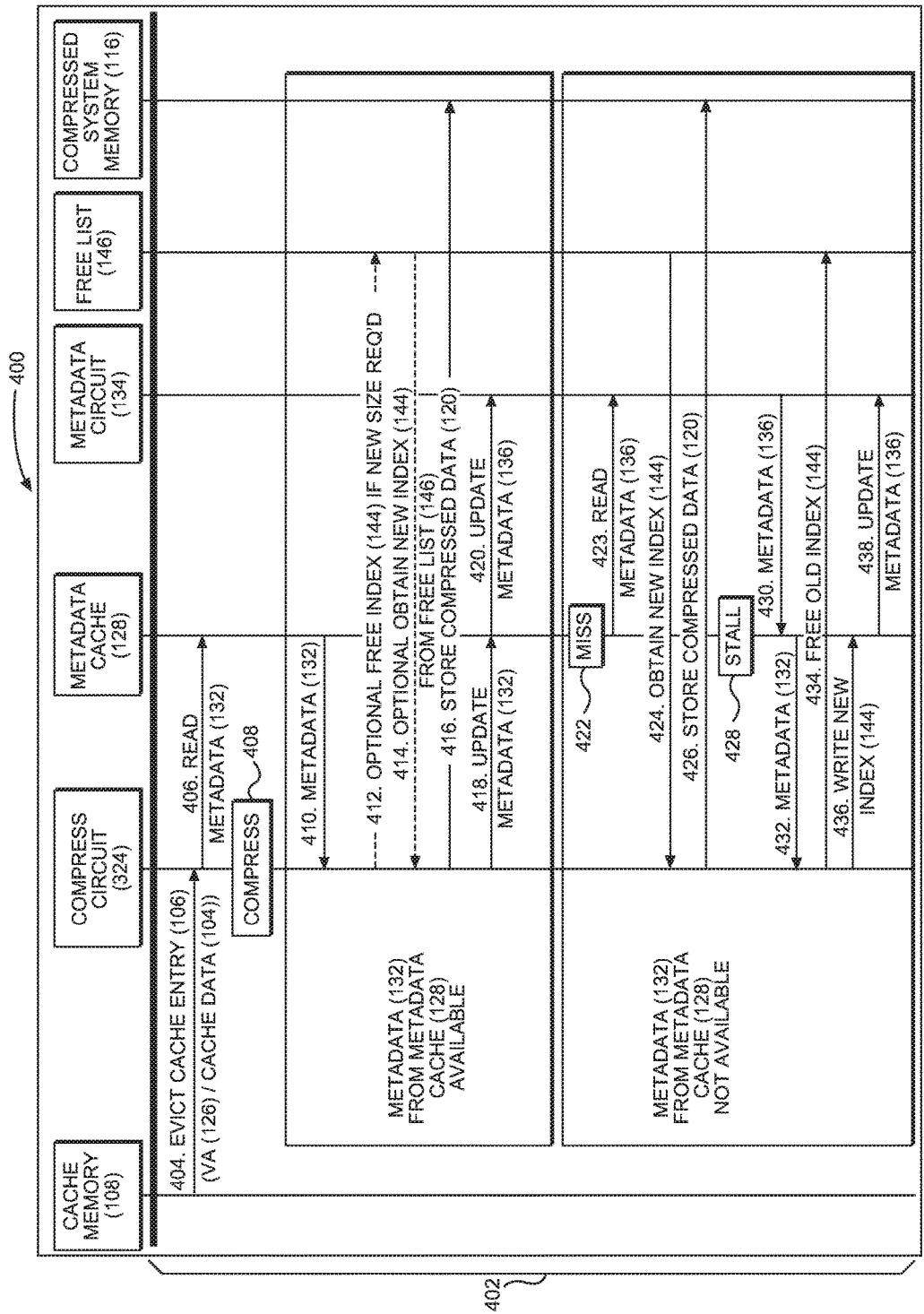
FIG. 4 is a flow diagram illustrating an exemplary cache eviction process performed in the compression memory system in FIG. 3, that includes compressing evicted cache data from an evicted cache entry and storing the compressed evicted cache data in the compressed system memory without buffering the evicted cache data.

FIG. 4 is a flow diagram 400 illustrating an exemplary cache eviction process 402 performed in the processor-based system 300 in FIG. 3 when evicting a cache entry 106(0)- 106(N) from the cache memory 108. With reference to FIG. 4, the cache memory 108 first sends the uncompressed cache data 104 and the associated VA 126 of the evicted cache entry 106(0)-106(N) to a compress circuit 324 in the compression circuit 322 as part of the cache eviction process 402 (task 404). The compress circuit 324 receives the uncompressed cache data 104 and associated VA 126 for the evicted cache entry 106(0)-106(N) from the cache memory 108. The compress circuit 324 sends a request to the metadata cache 128 to obtain the metadata 132 associated with the VA 126 for the evicted cache entry 106(0)-106(N) (task 406). The compress circuit 324 also compresses the uncompressed cache data 104 into compressed data 120 of a compression size to be stored in the compressed system memory 116 (task 408). For example, as shown in FIG. 3, the compress circuit 324 may be configured to compress sixty-four (64) byte (64B) data words down to forty-eight (48) byte (48B), thirty-two (32) byte (32B), or sixteen (16) byte (16B) compressed data words which can be stored in respective memory blocks 125 (48B), 125 (32B), 125 (16B) of less width than the entire width of a memory entry 118(0)-118(E). If uncompressed cache data 104 from the cache memory 108 cannot be compressed down to the next lower sized memory block 125 configured for the compression memory system 302, such uncompressed cache data 104 is stored uncompressed over the entire width of a memory entry 118(0)-118(E). For example, the width of the memory entry 118(0)-118(E) may be 64B in this example that can store 64B memory blocks 125 (64B).

With continuing reference to FIG. 4, if the metadata 132 is available from the metadata cache 128 (i.e., a cache hit), the metadata 132 is returned from the metadata cache 128 to the compress circuit 324 (task 410). The compress circuit 324 determines if the new compression size of the compressed data 120 fits into the same memory block size in the compressed system memory 116 as used to previously store data for the VA 126 of the evicted cache entry 106(0)-106 (N). For example, the processor 110 may have updated the cache data 104(0)-104(N) in the evicted cache entry 106(0)- 106(N) since being last stored in the compressed system memory 116. If a new memory block 125 is needed to store the compressed data 120 for the evicted cache entry 106(0)- 106(N), the compress circuit 324 recycles or frees an index 144 to the current memory block 125 in the compressed system memory 116 associated with the evicted cache entry 106(0)-106(N) to the free list 146 for reuse (task 412). The compress circuit 324 then obtains a new index 144 from the free list 146 to a new, available memory block 125 of the desired memory block size in the compressed system memory 116 to store the compressed data 120 for the evicted cache entry 106(0)-106(N) (task 414). The compress circuit 324 then stores the compressed data 120 for the evicted cache entry 106(0)-106(N) in the memory block 125 in the compressed system memory 116 associated with the metadata 132 for the evicted cache entry 106(0)-106(N) (task 416). For example, the metadata 132 may be used to determine a physical address (PA) and offset to address a memory entry 118(0)-118(E) and memory block 125 therein in the compressed system memory 116. Alternatively, the metadata 132 may be a PA and offset itself. The compress circuit 324 stores the compressed data 120 for the evicted cache entry 106(0)-106(N) in the memory block 125 in the compressed system memory 116 associated with the metadata 132 for the evicted cache entry 106(0)-106(N) whether the memory block 125 is the previously assigned memory block 125 or a newly assigned memory block 125 (task 416). If a new index 144 is obtained due to new compression size of the compressed data 120 as discussed, the compress circuit 324 also updates the metadata 132 associated with the VA 126 of the evicted cache entry 106(0)-106(N) in the metadata cache 128 (task 418), which causes the metadata cache 128 to update the metadata 136 associated with the VA 126 of the evicted cache entry 106(0)-106(N) in the metadata circuit 134 (task 420).

With continuing reference to FIG. 4, if however, the metadata 132 for the VA 126 associated with the evicted cache entry 106(0)-106(N) was not available in the metadata cache 128 (i.e., a cache miss) (task 422), the metadata cache 128 retrieves the metadata 136 for the VA 126 associated with the evicted cache entry 106(0)-106(N) from the metadata circuit 134 in the compressed system memory 116 (task 423). It is desired to not stall and also not buffer the compressed data 120 for the evicted cache entry 106(0)-106 (N) as previously discussed. Thus, in this example, as shown in FIG. 4, the compress circuit 324 makes arrangements to store the compressed data 120 for the evicted cache entry 106(0)-106(N) in the compressed system memory 116 without waiting for the metadata 136 to return from the metadata circuit 134. In this regard, the compress circuit 324 treats the process as if a new memory block 125 in a memory entry 118(0)-118(E) needs to be obtained from the free list 146 to be used to store compressed data 120 for the evicted cache entry 106(0)-106(N). The compress circuit 324 obtains a new index 144 from the free list 146 to a new, available memory block 125 of the desired memory block size in the compressed system memory 116 to store the compressed data 120 for the evicted cache entry 106(0)-106(N) (task 424). The compress circuit 324 then stores the compressed data 120 for the evicted cache entry 106(0)-106(N) in the memory block 125 in the compressed system memory 116 associated with the metadata 132 for the evicted cache entry 106(0)-106(N) (task 426). The compress circuit 324 then buffers the metadata 132 associated with the new index 144 in a metadata buffer 354 shown in FIG. 3 while waiting for the previous metadata 136 to be provided by the metadata circuit 134 in a stall (task 428). In this manner, the metadata associated with the new index 144 is buffered as opposed to the compressed data 120, which is larger in size and may require a larger buffer.

With continuing reference to FIG. 4, because a new index 144 was obtained to store the compressed data 120 for the evicted cache entry 106(0)-106(N), the metadata entry 138 (0)-138(V) in the metadata circuit 134 associated with the VA 126 of the evicted cache entry 106(0)-106(N) needs to be updated. This is because the metadata 136 stored in the metadata entry 138(0)-138(V) corresponding to the VA 126 of the evicted cache entry 106(0)-106(N) in the metadata circuit 134 is based on a prior, old index obtained from the free list 146. Thus, the index 144 associated with the metadata 136 stored in the metadata entry 138(0)-138(V) corresponding to the VA 126 of the evicted cache entry 106(0)-106(N) needs to be freed up in the free list 146. The metadata 136 stored in the metadata entry 138(0)-138(V) corresponding to the VA 126 of the evicted cache entry 106(0)-106(N) in metadata circuit 134 needs to be updated based on the new index 144 obtained from task 414 discussed above. In this regard, after the metadata 136 is returned from the metadata circuit 134 to the metadata cache 128 (task 430), the corresponding metadata 132 is returned from the metadata cache 128 to the compress circuit 324 (task 432), the compress circuit 324 frees the index 144 associated with the returned metadata 132 from the free list 146 to make such available for a new memory block 125 reservation in the future (task 434). The compress circuit 324 then writes new metadata 132 to the metadata cache 128 based on the new obtained index from task 423 into the metadata cache entry 130(0)-130(C) associated with the VA 126 of the evicted cache entry 106(0)-106(N) (task 436). The metadata 132 is also updated as metadata 136 in the metadata entry 138(0)-138(V) in the metadata circuit 134 associated with the VA 126 of the evicted cache entry 106(0)-106(N) (task 438). In this manner, subsequent memory accesses to the VA 126 associated with the evicted cache entry 106(0)-106(N) will be directed to the correct memory block 125 in the compressed system memory 116 according to the updated metadata 132 in the metadata cache 128 and corresponding metadata 136 in the metadata circuit 134.

Figure 5:
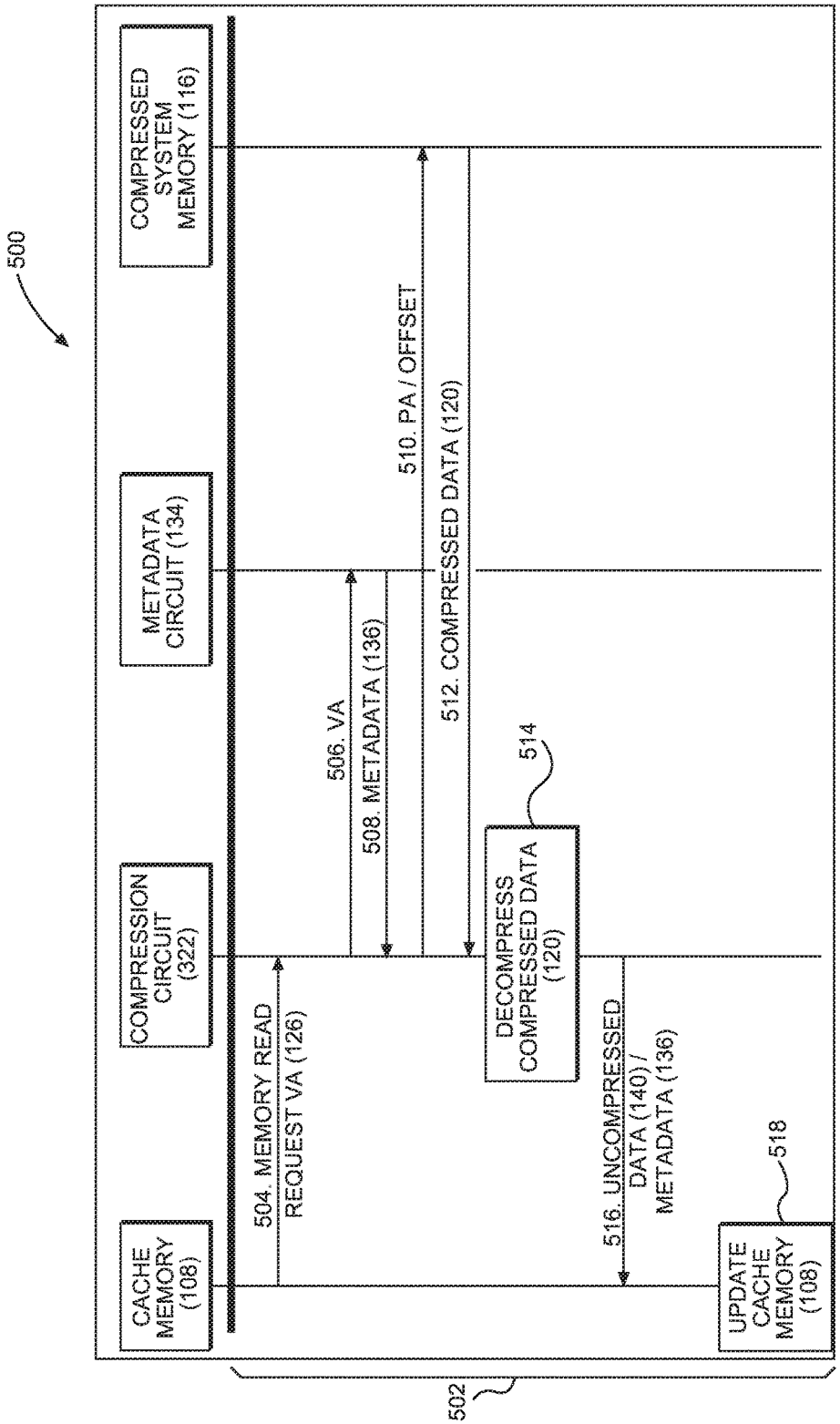
FIG. 5 is a flowchart illustrating the exemplary process of a memory read operation performed in the compression memory system of FIG. 3, for reading compressed data at a physical address in the compressed system memory based on a physical address determined using the metadata, and updating an entry in a metadata cache mapped to the virtual address of the memory read operation in response to a metadata cache miss.

FIG. 5 is a flow diagram 500 illustrating an exemplary memory read operation process 502 that is performed in the processor-based system 300 in FIG. 3 in response to a cache miss to the cache memory 108 and the eviction of a cache entry 106(0)-106(N) from the cache memory 108 to the compressed system memory 116. In this regard, the cache memory 108 is configured to issue a memory read request for a memory read operation to the compression circuit 322 (task 504). The memory read request comprises the VA in the compressed system memory 116 to be read by the processor 110. In response, compression circuit 322 issues a metadata lookup request with the VA to the metadata circuit 134 in the compressed system memory 116 to receive the metadata 136 associated with the memory read request (task 506). The compression circuit 322 then receives the metadata 136 associated with the VA for the memory read request from the metadata circuit 134 (task 508). The compression circuit 322 uses the metadata 136 received from the metadata circuit 134 to determine the physical address (PA) of the memory entry 118(0)-118(E) and the offset to the memory block 125 therein in the compressed system memory 116 associated with the VA of the memory read request (task 510). The compression circuit 322 then accesses the memory block 125 of memory entry 118(0)-118(E) corresponding to the VA of the memory read request to obtain the compressed data 120 for the memory read request (task 512).

With continuing reference to FIG. 5, the decompress circuit 327 in the compression circuit 322 then decompresses the compressed data 120 into uncompressed data 140 (task 514). The decompress circuit 327 provides the uncompressed data 140 to the cache memory 108 to be inserted in an available cache entry 106(0)-106(N) (task 516). The cache memory 108 inserts the uncompressed data 140 in the available cache entry 106(0)-106(N) corresponding to the VA of the memory read request.

Figure 6:
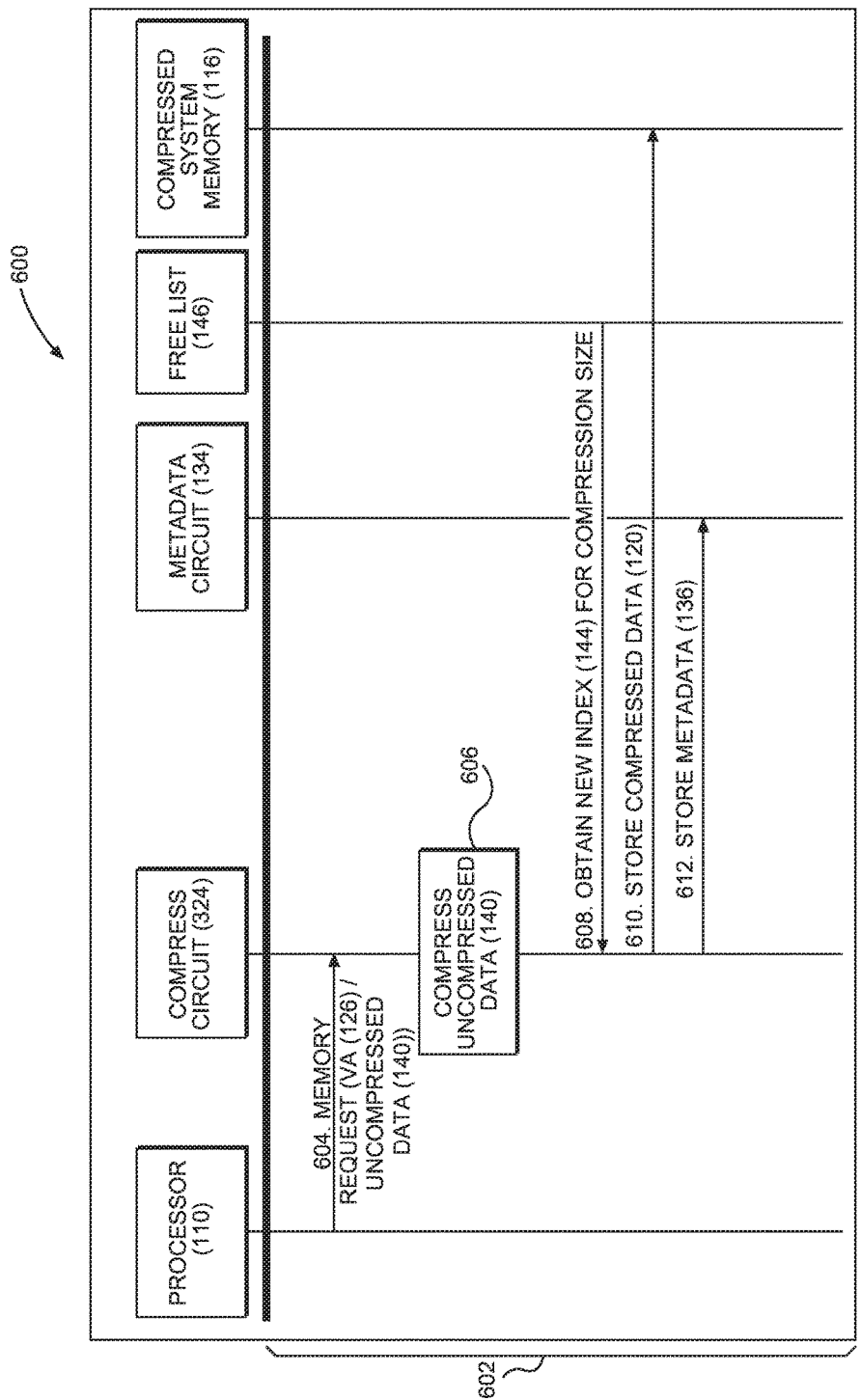
FIG. 6 is a flow diagram illustrating an exemplary memory write operation in the processor-based system in FIG. 3.

FIG. 6 is a flow diagram 600 illustrating an exemplary memory write process 602 in the processor-based system 300 in FIG. 3 that is not a cache eviction. In this regard, the processor 110 is configured to issue a memory write request for a memory write operation to the compress circuit 324 (task 604). The memory write request comprises uncompressed write data shown as uncompressed data 140 to be written and the VA of the location in the compressed system memory 116 to be written. In response, the compress circuit 324 compresses the received uncompressed data 140 into compressed write data as compressed data 120 of a compression size (task 606). The compress circuit 324 obtains an index 144 for an available memory block 125 in the compressed system memory 116 from the free list 146 based on the compression size of the compressed data 120 (task 608). The compression circuit 322 uses the index 144 received from the free list 146 to determine the physical address (PA) of the memory entry 118(0)-118(E) and the offset to the memory block 125 therein in the compressed system memory 116 to write the compressed data 120 (task 610). The compress circuit 324 then writes metadata 136 to the metadata entry 138(0)-138(V) in the metadata circuit 134 in the compressed system memory 116 corresponding to the VA of the memory write request to be accessed during a subsequent memory read operation to the VA, as described above in FIG. 5 (task 612). If the processor-based system 300 includes the metadata cache 128, the compress circuit 324 can also be configured to update the metadata 132 for metadata cache entry 130(0)-130(C) corresponding to the VA or create a new metadata cache entry 130(0)-130(C).

In another exemplary aspect, a compression circuit in a processor-based system is provided. An example of a processor-based system is the processor-based system 300 in FIG. 3. An example of a compression circuit is compression circuit 322 in FIG. 3. The compression circuit 322 comprises a means for receiving uncompressed cache data and a virtual address associated with an evicted cache entry from a cache memory. An example of a means for receiving uncompressed cache data and a virtual address associated with an evicted cache entry from a cache memory is in task 404 in FIG. 4 referencing FIG. 3, wherein the compress circuit 324 receives the uncompressed cache data 104 and associated VA 126 for the evicted cache entry 106(0)-106(N) from the cache memory 108. The compression circuit 322 also comprises a means for compressing the uncompressed cache data into compressed data of a compression size. An example of a means for compressing the uncompressed cache data into compressed data of a compression size includes the compress circuit 324 in FIG. 3, where the cache memory 108 sends the uncompressed cache data 104 and the associated VA 126 of the evicted cache entry 106(0)-106(N) to the compress circuit 324 in the compression circuit 322 as part of the cache eviction process 402 in task 404 in FIG. 4. The compression circuit 322 also comprises a means for reading first metadata from a metadata cache associated with the virtual address associated with the evicted cache entry. An example of a means for reading first metadata from a metadata cache associated with the virtual address associated with the evicted cache entry is the compress circuit 324 in FIG. 3 sending a request to the metadata cache 128 to obtain the metadata 132 associated with the VA 126 for the evicted cache entry 106(0)-106(N), as shown in task 406 in FIG. 4. The compression circuit 322 also comprises a means for reading second metadata from a metadata circuit in a compressed system memory associated with the virtual address associated with the evicted cache entry into the metadata cache. An example of a means for reading second metadata from a metadata circuit in a compressed system memory associated with the virtual address associated with the evicted cache entry into the metadata cache is the metadata cache 128 in FIG. 3 retrieves the metadata 136 for the VA 126 associated with the evicted cache entry 106(0)-106(N) from the metadata circuit 134 in the compressed system memory 116, as shown in task 423 in FIG. 4.

The compression circuit 322 in this example also comprises a means for obtaining an index to a new memory block in a memory entry associated with a new physical address from a free list, in response to the first metadata associated with the virtual address associated with the evicted cache entry not being available from the metadata cache after compressing the uncompressed cache data into the compressed data of the compression size. An example of a means for obtaining an index to a new memory block in a memory entry associated with a new physical address from a free list is the compress circuit 324 in FIG. 3 obtaining a new index 144 from the free list 146 to a new, available memory block 125 of the desired memory block size in the compressed system memory 116 to store the compressed data 120 for the evicted cache entry 106(0)-106(N), as also discussed in task 414 in FIG. 4. The compression circuit 322 also comprises a means for storing the compressed data in the new memory block at the memory entry at the new physical address in the compressed system memory based on the obtained index, and a means for storing new metadata associated with the new physical address of the new memory block in a metadata buffer, in response to the first metadata associated with the virtual address associated with the evicted cache entry not being available from the metadata cache after compressing the uncompressed cache data into the compressed data of the compression size. An example of a means for storing the compressed data in the new memory block at the memory entry at the new physical address in the compressed system memory based on the obtained index is the compress circuit 324 in FIG. 3 storing the compressed data 120 for the evicted cache entry 106(0)-106(N) in the memory block 125 in the compressed system memory 116 associated with the metadata 132 for the evicted cache entry 106(0)-106(N), as also shown in task 416 in FIG. 4. The compression circuit 322 also comprises a means for storing the new metadata from the metadata buffer in a metadata entry associated with the virtual address associated with the evicted cache entry in the metadata circuit in the compressed system memory, in response to the first metadata associated with the virtual address associated with the evicted cache entry not being available from the metadata cache after compressing the uncompressed cache data into the compressed data of the compression size. An example of a means for storing the new metadata from the metadata buffer in a metadata entry associated with the virtual address associated with the evicted cache entry in the metadata circuit in the compressed system memory is the compress circuit 324 in FIG. 3 updating the metadata 132 associated with the VA 126 of the evicted cache entry 106(0)-106(N) in the metadata cache 128, which causes the metadata cache 128 to update the metadata 136 associated with the VA 126 of the evicted cache entry 106(0)-106(N) in the metadata circuit 134, as also discussed in tasks 418 and 420 in FIG. 4.

A processor-based system that includes a compression circuit configured to buffer metadata used for determining a physical address in a compressed system memory to write the evicted cache data, and to avoid buffering of evicted cache data from an evicted cache entry when stalls occur reading metadata may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
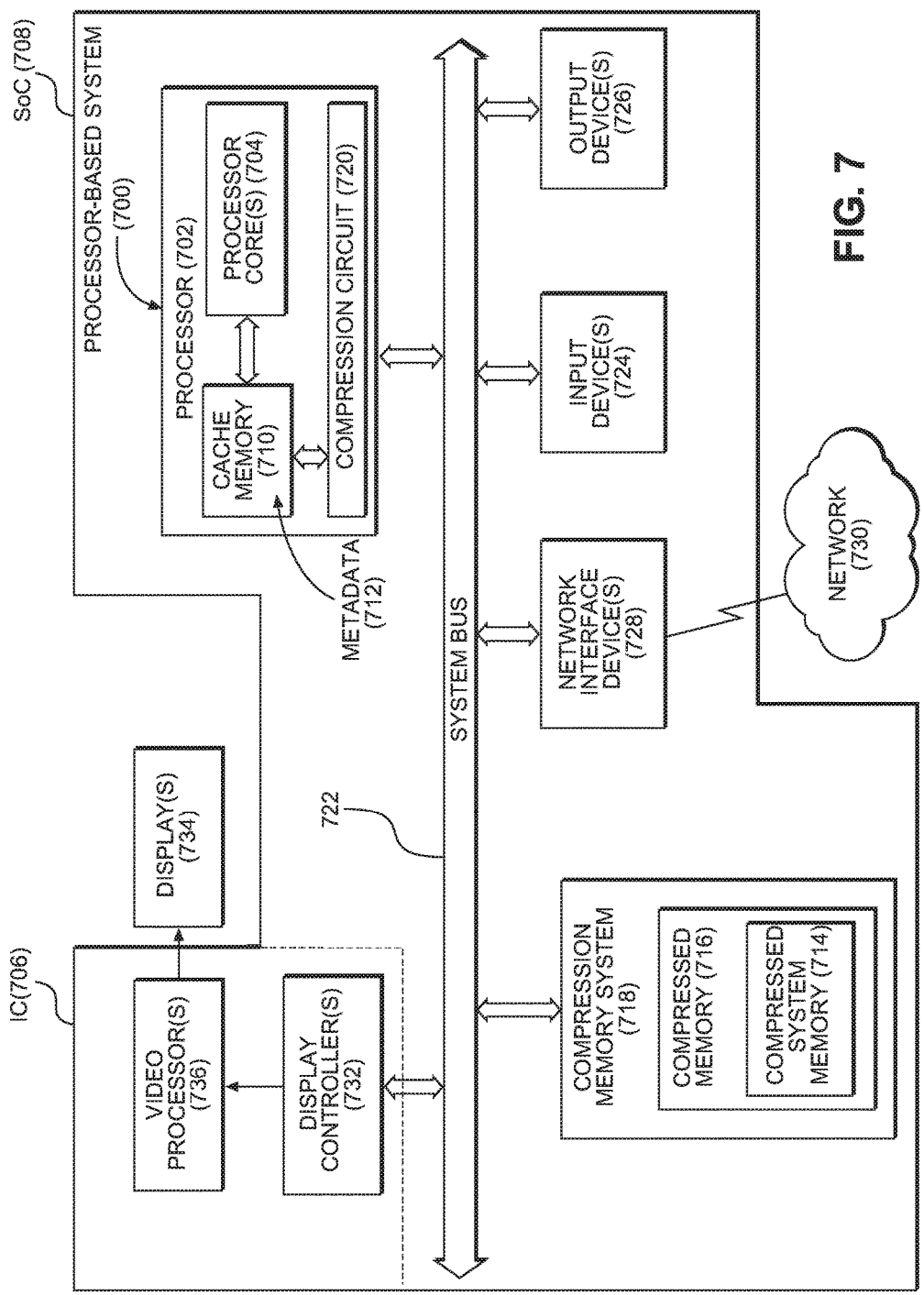
FIG. 7 is a block diagram of an exemplary processor-based system, such as the processor-based system in FIG. 3, that includes a memory system, configured to store compressed evicted cache data at a new physical address in compressed system memory if metadata used to map the virtual address for the evicted cache entry in the compressed system memory is not available, to avoid having to buffer the evicted cache data until the metadata becomes available.

In this regard, FIG. 7 illustrates an example of a processor-based system 700 that includes a processor 702 that includes one or more processor cores 704. The processor-based system 700 is provided in an IC 706. The IC 706 may be included in or provided as a SoC 708 as an example. The processor 702 includes a cache memory 710 whose evicted cache entries are written to compressed system memory 714 as part of a compressed memory 716 in a compression memory system 718. For example, the processor 702 may be the processor 110 in FIG. 3, the cache memory 710 may be the cache memory 108 in FIG. 3, and the compression memory system 302 in FIG. 3 may be the compression memory system 718, as non-limiting examples. In this regard, the compressed system memory 714 may be the compressed system memory 116 in FIG. 3. A compression circuit 720 is provided for compressing and decompressing data to and from the compressed system memory 714. The compression circuit 720 is configured to buffer metadata used for determining a physical address in a compressed system memory to write the evicted cache data, and to avoid buffering of evicted cache data from an evicted cache entry when stalls occur reading metadata may be provided in or integrated into any processor-based device. The compression circuit 720 may be provided in the processor 702 or outside of the processor 702 and communicatively coupled to the processor 702 through a shared or private bus. The compression circuit 720 may be the compression circuit 322 in FIG. 3 as a non-limiting example.

The processor 702 is coupled to a system bus 722 to intercouple master and slave devices included in the processor-based system 700. The processor 702 can also communicate with other devices by exchanging address, control, and data information over the system bus 722. Although not illustrated in FIG. 7, multiple system buses 722 could be provided, wherein each system bus 722 constitutes a different fabric. For example, the processor 702 can communicate bus transaction requests to the compression memory system 718 as an example of a slave device. Other master and slave devices can be connected to the system bus 722. As illustrated in FIG. 7, these devices can include one or more input devices 724. The input device(s) 724 can include any type of input device, including but not limited to input keys, switches, voice processors, etc. The input device(s) 724 may be included in the IC 706 or external to the IC 706, or a combination of both. Other devices that can be connected to the system bus 722 can also include one or more output devices 726 and one or more network interface devices 728. The output device(s) 726 can include any type of output device, including but not limited to audio, video, other visual indicators, etc. The output device(s) 726 may be included in the IC 706 or external to the IC 706, or a combination of both. The network interface device(s) 728 can be any devices configured to allow exchange of data to and from a network 730. The network 730 can be any type of network, including but not limited to a wired or wireless network, a private or public network, a local area network (LAN), a wireless local area network (WLAN), a wide area network (WAN), a BLUETOOTH™ network, and the Internet. The network interface device(s) 728 can be configured to support any type of communications protocol desired.

Other devices that can be connected to the system bus 722 can also include one or more display controllers 732 as examples. The processor 702 may be configured to access the display controller(s) 732 over the system bus 722 to control information sent to one or more displays 734. The display controller(s) 732 can send information to the display(s) 734 to be displayed via one or more video processors 736, which process the information to be displayed into a format suitable for the display(s) 734. The display controller(s) 732 and/or the video processor(s) 736 may be included in the IC 706 or external to the IC 706, or a combination of both.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A compression circuit in a processor-based system, the compression circuit configured to, in response to eviction of a cache entry in a cache memory:
    receive uncompressed cache data and a virtual address associated with the evicted cache entry in the cache memory;
    compress the uncompressed cache data into compressed data of a compression size;
    read first metadata from a metadata cache associated with the virtual address associated with the evicted cache entry, the metadata cache comprising a plurality of metadata cache entries each indexed by a virtual address, each metadata cache entry among the plurality of metadata cache entries comprising metadata associated with a physical address in a compressed system memory;
    read second metadata from a metadata circuit in the compressed system memory associated with the virtual address associated with the evicted cache entry into the metadata cache, the metadata circuit comprising a plurality of metadata entries each indexed by a virtual address, each metadata entry among the plurality of metadata entries comprising metadata associated with a physical address in the compressed system memory;
    in response to the first metadata associated with the virtual address associated with the evicted cache entry not being available from the metadata cache after compressing the uncompressed cache data into the compressed data of the compression size, the compression circuit is further configured to:
  obtain an index to a new memory block in a memory entry associated with a new physical address from a free list; and
  store the compressed data in the new memory block at the memory entry at the new physical address in the compressed system memory based on the obtained index;
  store new metadata associated with the new physical address of the new memory block in a metadata buffer; and
  store the new metadata from the metadata buffer in the metadata entry associated with the virtual address associated with the evicted cache entry in the metadata circuit in the compressed system memory.

2. The compression circuit of claim 1, further configured to, in response to the first metadata associated with the virtual address associated with the evicted cache entry not being available from the metadata cache after compressing the uncompressed cache data into the compressed data of the compression size:
  receive the metadata associated with the new physical address from the metadata circuit in the compressed system memory; and
  free the index associated with the received metadata associated with the new physical address from the metadata circuit in the compressed system memory in the free list.

3. The compression circuit of claim 1, wherein the compression circuit is configured to store the compressed data in the memory block at the physical address in the compressed system memory indicated by the received metadata associated with the evicted cache entry.

4. The compression circuit of claim 1, further configured to, in response to the first metadata associated with the virtual address associated with the evicted cache entry being available from the metadata cache after compressing the uncompressed cache data into the compressed data of the compression size:
  store the compressed data in a memory block in a memory entry at a physical address in the compressed system memory associated with the received metadata associated with the virtual address associated with the evicted cache entry.

5. The compression circuit of claim 4, further configured to, in response to the first metadata associated with the virtual address associated with the evicted cache entry being available from the metadata cache after compressing the uncompressed cache data into the compressed data of the compression size:
  determine if the memory block at the physical address in the compressed system memory associated with the metadata associated with the virtual address associated with the evicted cache entry can accommodate the compression size of compressed data;
  in response to determining that the memory block cannot accommodate the compression size of compressed data:
    obtain an index to a new memory block associated with a memory entry at a new physical address from a free list;
    store the compressed data in the new memory block in the memory entry at the new physical address in the compressed system memory based on the obtained index;
    free the index associated with the metadata associated with the evicted cache entry in the free list; and
    store new metadata associated with the obtained index in the metadata cache entry associated with the virtual address associated with the evicted cache entry in the metadata cache.

6. The compression circuit of claim 5, further configured to, in response to the first metadata associated with the virtual address associated with the evicted cache entry being available from the metadata cache after compressing the uncompressed cache data into the compressed data of the compression size:
  store the new metadata associated with the obtained index in the metadata entry associated with the virtual address associated with the evicted cache entry in the metadata circuit.

7. The compression circuit of claim 1, wherein in response to a cache miss for a memory read operation, further configured to:
  receive a memory read request comprising a virtual address for the memory read operation;
  determine if metadata associated with the virtual address for the memory read operation is contained in a metadata cache entry in the metadata cache;
  if metadata associated with the virtual address for the memory read operation is contained in a metadata cache entry in the metadata cache:
    provide the physical address associated with the metadata to the compressed system memory;
    receive compressed data from a memory entry at the physical address associated with the metadata in the compressed system memory; and
    decompress the received compressed data into uncompressed data.

8. The compression circuit of claim 1, wherein in response to a cache miss for a memory read operation, further configured to, in response to the first metadata associated with the virtual address for the memory read operation not being contained in the metadata cache:
  provide the virtual address of a memory read request to the compressed system memory;
  receive compressed data from a memory entry at a physical address in the compressed system memory mapped to the virtual address;
  receive metadata associated with the physical address in the compressed system memory mapped to the virtual address from the compressed system memory;
  decompress the received compressed data into uncompressed data; and
  store the metadata associated with the physical address in the compressed system memory mapped to the virtual address in an available metadata cache entry in the metadata cache.

9. The compression circuit of claim 1, further configured to, in response to a memory write operation:
  receive a memory write request comprising a virtual address and write data for the memory write operation;
  compress the write data to compressed write data of a compression size;
  determine a physical address of a memory entry in the compressed system memory that has an available memory block for the compression size of the compressed write data; and
  write the compressed write data to the available memory block in the memory entry of the determined physical address.

10. The compression circuit of claim 9, further configured to, in response to the memory write operation:
　store metadata in a metadata cache entry in the metadata cache associated with the virtual address for the memory write request, the metadata associated with the determined physical address for the memory write operation.

11. The compression circuit of claim 1 integrated into a processor-based system.

12. The compression circuit of claim 1 integrated into a system-on-a-chip (SoC) comprising a processor.

13. The compression circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device (e.g., a smart watch, a health or fitness tracker, eyewear, etc.); a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

14. A method of evicting cache data from an evicted cache entry to a compressed system memory, comprising:
　receiving uncompressed cache data and a virtual address associated with the evicted cache entry from a cache memory;
　compressing the uncompressed cache data into compressed data of a compression size;
　reading first metadata from a metadata cache associated with the virtual address associated with the evicted cache entry;
　reading second metadata from a metadata circuit in the compressed system memory associated with the virtual address associated with the evicted cache entry into the metadata cache;
　in response to the first metadata associated with the virtual address associated with the evicted cache entry not being available from the metadata cache after compressing the uncompressed cache data into the compressed data of the compression size, the method further comprising:
　　obtaining an index to a new memory block in a memory entry associated with a new physical address from a free list;
　　storing the compressed data in the new memory block at the memory entry at the new physical address in the compressed system memory based on the obtained index;
　　storing new metadata associated with the new physical address of the new memory block in a metadata buffer; and
　　storing the new metadata from the metadata buffer in a metadata entry associated with the virtual address associated with the evicted cache entry in the metadata circuit in the compressed system memory.

15. The method of claim 14, further comprising, in response to the first metadata associated with the virtual address associated with the evicted cache entry not being available from the metadata cache after compressing the uncompressed cache data into the compressed data of the compression size:
　receiving the metadata associated with the new physical address from the metadata circuit in the compressed system memory; and
　freeing the index associated with the received metadata associated with the new physical address from the metadata circuit in the compressed system memory in the free list.

16. The method of claim 14, further comprising, in response to the first metadata associated with the virtual address associated with the evicted cache entry being available from the metadata cache after compressing the uncompressed cache data into the compressed data of the compression size:
　storing the compressed data in a memory block in a memory entry at a physical address in the compressed system memory associated with the received metadata associated with the virtual address associated with the evicted cache entry.

17. The method of claim 15, further comprising, in response to the first metadata associated with the virtual address associated with the evicted cache entry being available from the metadata cache after compressing the uncompressed cache data into the compressed data of the compression size:
　determining if the memory block at the physical address in the compressed system memory associated with the metadata associated with the virtual address associated with the evicted cache entry can accommodate the compression size of the compressed data;
　in response to determining that the memory block cannot accommodate the compression size of the compressed data:
　　obtaining an index to a new memory block associated with a memory entry at a new physical address from a free list;
　　storing the compressed data in the new memory block in the memory entry at the new physical address in the compressed system memory based on the obtained index;
　　freeing the index associated with the evicted cache entry in the free list; and
　　storing new metadata associated with the obtained index in a metadata cache entry associated with the virtual address associated with the evicted cache entry in the metadata cache.

18. The method of claim 17, further comprising, in response to the first metadata associated with the virtual address associated with the evicted cache entry being available from the metadata cache after compressing the uncompressed cache data into the compressed data of the compression size:
　storing the new metadata associated with the obtained index in the metadata entry associated with the virtual address associated with the evicted cache entry in the metadata circuit.

19. A processor-based system, comprising:
　a processor core configured to issue memory read operations and memory write operations;
　a metadata cache comprising a plurality of metadata cache entries each indexed by a virtual address, each metadata cache entry among the plurality of metadata cache entries comprising first metadata associated with a physical address in a compressed system memory, the compressed system memory comprising:

a plurality of memory entries each addressable by a physical address and each configured to store compressed data; and a metadata circuit comprising a plurality of metadata entries each indexed by a virtual address, each metadata entry among the plurality of metadata entries comprising second metadata associated with a physical address in the compressed system memory; and a compression circuit configured to, in response to eviction of a cache entry in a cache memory:

receive uncompressed cache data and the virtual address associated with the evicted cache entry from the cache memory;

compress the uncompressed cache data into compressed data of a compression size;

read the first metadata from the metadata cache associated with the virtual address associated with the evicted cache entry; and read the second metadata from the metadata circuit in the compressed system memory based on the virtual address associated with the evicted cache entry into the metadata cache;

in response to the first metadata associated with the virtual address associated with the evicted cache entry not being available from the metadata cache after compressing the uncompressed cache data into the compressed data of the compression size, the compression circuit is further configured to:

obtain an index to a new memory block in a memory entry associated with a new physical address from a free list;

store the compressed data in the new memory block at the memory entry at the new physical address in the compressed system memory based on the obtained index;

store new metadata associated with the new physical address of the new memory block in a metadata buffer; and store the new metadata from the metadata buffer in the metadata entry associated with the virtual address associated with the evicted cache entry in the metadata circuit in the compressed system memory.

20. The processor-based system of claim 19, wherein the compression circuit is further configured to, in response to the first metadata associated with the virtual address associated with the evicted cache entry being available from the metadata cache after compressing the uncompressed cache data into the compressed data of the compression size:

store the compressed data in a memory block in a memory entry at a physical address in the compressed system memory associated with the received metadata associated with the virtual address associated with the evicted cache entry.

21. A compression circuit in a processor-based system, comprising:

a means for receiving uncompressed cache data and a virtual address associated with an evicted cache entry from a cache memory;

a means for compressing the uncompressed cache data into compressed data of a compression size;

a means for reading first metadata from a metadata cache associated with the virtual address associated with the evicted cache entry;

a means for reading second metadata from a metadata circuit in a compressed system memory associated with the virtual address associated with the evicted cache entry into the metadata cache;

in response to the first metadata associated with the virtual address associated with the evicted cache entry not being available from the metadata cache after compressing the uncompressed cache data into the compressed data of the compression size:

a means for obtaining an index to a new memory block in a memory entry associated with a new physical address from a free list;

a means for storing the compressed data in the new memory block at the memory entry at the new physical address in the compressed system memory based on the obtained index;

a means for storing new metadata associated with the new physical address of the new memory block in a metadata buffer; and a means for storing the new metadata from the metadata buffer in a metadata entry associated with the virtual address associated with the evicted cache entry in the metadata circuit in the compressed system memory.

22. A non-transitory computer-readable medium having stored thereon computer executable instructions which, when executed, cause a processor to:

receive uncompressed cache data and a virtual address associated with an evicted cache entry from a cache memory;

compress the uncompressed cache data into compressed data of a compression size;

read first metadata from a metadata cache associated with the virtual address associated with the evicted cache entry;

read second metadata from a metadata circuit in a compressed system memory associated with the virtual address associated with the evicted cache entry into the metadata cache; and in response to the first metadata associated with the virtual address associated with the evicted cache entry not being available from the metadata cache after compressing the uncompressed cache data into the compressed data of the compression size:

obtain an index to a new memory block in a memory entry associated with a new physical address from a free list;

store the compressed data in the new memory block at the memory entry at the new physical address in the compressed system memory based on the obtained index;

store new metadata associated with the new physical address of the new memory block in a metadata buffer; and store the new metadata from the metadata buffer in a metadata entry associated with the virtual address associated with the evicted cache entry in the metadata circuit in the compressed system memory.

* * * * *